(12) United States Patent
King et al.

(10) Patent No.: US 6,315,023 B1
(45) Date of Patent: Nov. 13, 2001

(54) CARD MANUFACTURING MACHINE ASSEMBLY

(75) Inventors: Dennis Michael King, Livonia; Martin Wilson, St. Clair Shores, both of MI (US)

(73) Assignee: Saxon, Inc., Ferndale, MI (US)

( * ) Notice: Subject to any disclaimer, the term of this patent is extended or adjusted under 35 U.S.C. 154(b) by 0 days.

(21) Appl. No.: 09/303,723

(22) Filed: Apr. 30, 1999

(51) Int. Cl.⁷ .............................. B32B 31/08; B32B 31/18
(52) U.S. Cl. ..................... 156/494; 156/387; 156/510; 156/512; 156/543
(58) Field of Search ...................... 156/260, 249, 156/259, 361, 510, 512, 554, 543; 226/188, 198, 195; 271/202, 204

(56) References Cited

U.S. PATENT DOCUMENTS

| | | |
|---|---|---|
| 3,051,604 | 8/1962 | Andrews . |
| 4,359,358 | 11/1982 | Hattemer . |
| 4,438,696 | 3/1984 | George et al. . |
| 5,021,110 | 6/1991 | Kobayashi . |
| 5,052,296 * | 10/1991 | Shiba .................................. 101/227 |
| 5,087,313 * | 2/1992 | Duecker ............................... 156/271 |
| 5,417,458 | 5/1995 | Best et al. . |
| 5,466,321 | 11/1995 | Miyaji . |
| 5,571,358 | 11/1996 | Napier et al. . |
| 5,695,107 * | 12/1997 | Shoemaker, Jr. ....................... 226/39 |
| 5,776,287 | 7/1998 | Best et al. . |

* cited by examiner

*Primary Examiner*—Richard Crispino
*Assistant Examiner*—Sue A. Purvis
(74) *Attorney, Agent, or Firm*—Howard & Howard

(57) ABSTRACT

A card manufacturing machine assembly for producing a coupon card fabricated from a continuous sheet of stock. The machine assembly has a support frame for supporting the continuous sheet of stock as the sheet of stock moves through the machine assembly. A driving mechanism is mounted to the support frame and has driving gears for transferring the sheet of stock through the machine assembly at a predetermined speed. A printing station prints indicia on the continuous sheet of stock in two parallel rows. A cutting device separates the continuous sheet of stock into two strips. An inverting device rotates one of the strips 180° relative to the other strip. A stripping device removes a release liner from one of the strips to expose an adhesive layer. A pair of coupling rollers are mounted to the support frame and are in driving engagement with one of the driving gears to rotate the coupling rollers at a predetermined rotational speed. The coupling rollers move the adhesive layer of one strip into a bonded relationship with the release liner of the other strip to mate the strips and form a continuous series of two-sided coupon cards. A pair of forming rollers are mounted to the support frame and are in driving engagement with one of the driving gears to rotate the forming rollers at a faster speed of rotation than the predetermined rotational speed. The forming rollers engage the series of two-sided coupon cards and remove any exterior material from the strips to form individual coupon cards.

17 Claims, 7 Drawing Sheets

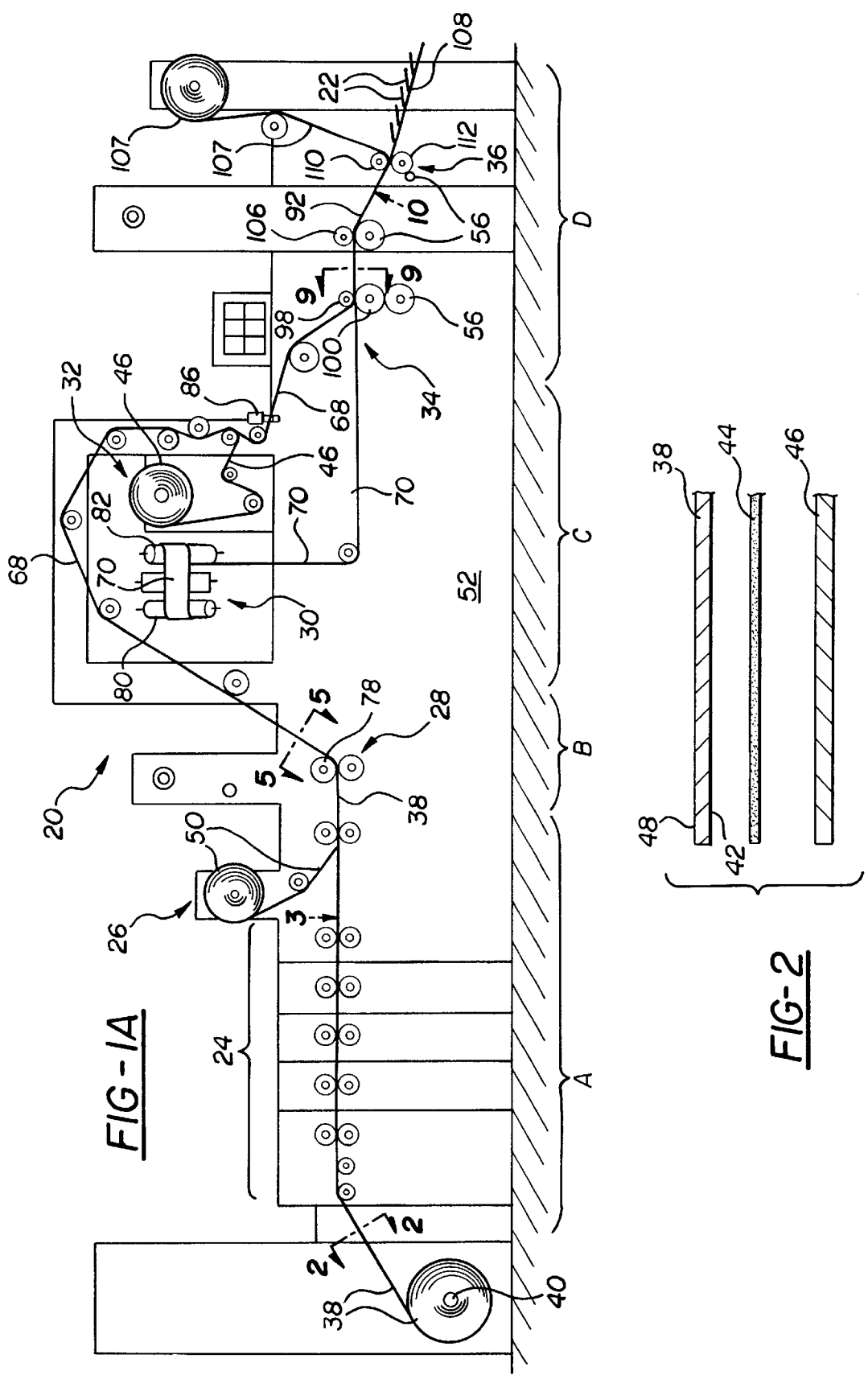

CARD MANUFACTURING MACHINE ASSEMBLY

TECHNICAL FIELD

The subject invention relates to a card manufacturing machine for producing a two-sided coupon card from a continuous sheet of stock.

BACKGROUND OF THE INVENTION

Multi-layered labels or coupons and their manufacture are well known in the art. These multi-layered labels have individual layers of card stock adhered on top of one another. Each layer of card stock is printed with informational messages, advertisements and/or coupons. The inner layer of card stock is typically attached to an article such as a beverage or food container. A user then peels the outer layer of card stock from the inner layer to expose a one time coupon.

Examples of machines for manufacturing these types of multi-layered coupons are disclosed in U.S. Pat. Nos. 5,021,110 and 5,466,321. The multi-layer coupons disclosed in the prior art are intended to be attached to an article and are not designed for individual use and transportation, i.e., used as a coupon that a user carries around his/her wallet or purse. Once the outer layer of card stock or coupon is removed, the structure becomes a flimsy piece of film. In addition, these multi-layered coupons do not have any messages or coupons printed onto a back or bottom surface. Accordingly, it is desirable to have a dual surface printed coupon that can retain its rigidity once a coupon or coupons are removed. In other words, it is desirable to have a card that includes printed information or coupons on a top surface and also includes printed information or coupons on a bottom surface, whereby the coupons can be peeled off and redeemed while still maintaining sufficient rigidity for the card.

Such a two-sided coupon card is disclosed in U.S. Pat. No. 5,417,458, which is assigned to the assignee of the subject invention. This two-sided coupon card comprises a first half and a second half. Both halves include a card stock with an adhesive layer and a film liner applied to a bottom surface and a laminate applied to a top surface. Typically, the first half has marketing information printed on the top surface thereof and the second half has a number of mini-coupons printed on the top surface thereof. The film liner is then removed from the first half of the card stock to expose the adhesive layer. The card stock is then folded in half such that the bottom surface of the first half is adhered to the bottom surface of the second half by the adhesive layer. One of the halves is scored to create a number of mini-coupons. This card construction creates a two-sided coupon card having two layers of card stock. One layer of card stock stays with the coupon as the mini-coupon is removed and the other layer of card stock remains on the card to provide sufficient rigidity for the card. The removing of the film liner and the folding of the card stock are accomplished by manually handling the coupon.

A manufacturing machine has been developed which automatically removes the film liner and folds the card to form the two-sided coupon cards. This machine is disclosed and claimed in U.S. Pat. No. 5,776,287, which is assigned to the assignee of the subject invention. The machine of the '287 patent discloses a novel inverting device which automatically folds the two halves of the card stock together. The machine of the '287 patent operates at relatively high speeds which moves the continuous sheet of stock quickly through the machine and produces a high volume of two-sided coupon cards. Due to the relative high speed of the card manufacturing machine, some quality control problems can arise. Specifically, buckling and/or bending of the sheet of stock can occur which may misalign the first half of the coupon card with the second half of the coupon card such that the two-sided coupon card is produced without the desired characteristics.

Accordingly, it is desirable to develop a high-speed coupon card manufacturing machine which eliminates the potential for any quality control problems. Specifically, it is desirable to develop a card manufacturing machine which maintains the desired speed of the continuous sheet of stock as the sheet of stock passes through the machine and creates a high quality two-sided coupon card.

SUMMARY OF THE INVENTION AND ADVANTAGES

A card manufacturing machine assembly for producing a coupon card fabricated from a continuous sheet of stock having a top surface covered by a clear laminate and a bottom surface having an adhesive layer and a release liner adhered thereto. The machine assembly comprises a support frame for supporting the continuous sheet of stock as the sheet of stock moves through the machine assembly. A driving mechanism is mounted to the support frame and has a plurality of driving gears for transferring the sheet of stock through the machine assembly at a predetermined speed. A printing station prints indicia on the top surface of the continuous sheet of stock in two parallel rows that define a first strip and a second strip of the stock. A cutting device separates the continuous sheet of stock into the first and second strips. An inverting device rotates one of the first and second strips 180° relative to the other first and second strip. A stripping device removes the release liner from the first strip to expose the adhesive layer. A pair of oppositely disposed coupling rollers are mounted to the support frame and are in driving engagement with the driving gears for defining a first driving ratio to rotate the coupling rollers at a predetermined rotational speed. The coupling rollers move the adhesive layer of the first strip into a bonded relationship with the release liner of the second strip to mate the first and strips and form a series of two-sided coupon cards. A pair of oppositely disposed forming rollers are mounted to the support frame and are in driving engagement with the driving gears for defining a second driving ratio to rotate the forming rollers at a faster speed of rotation than the predetermined rotational speed. The forming rollers engage the series of two-sided coupon cards and remove any exterior material from the first and second strips to form individual coupon cards.

Accordingly, the subject invention provides a high-speed card manufacturing machine which does not allow the continuous sheet of stock to buckle or bend which produces a large volume of high-quality two-sided coupon cards.

BRIEF DESCRIPTION OF THE DRAWINGS

Other advantages of the present invention will be readily appreciated as the same becomes better understood by reference to the following detailed description when considered in connection with the accompanying figures wherein:

FIG. 1A is a frontal schematic view of a card manufacturing machine assembly of the subject invention;

FIG. 2 is an exploded cross-sectional view taken along line 2—2 of FIG. 1;

DETAILED DESCRIPTION OF THE PREFERRED EMBODIMENT

Figure 1B:
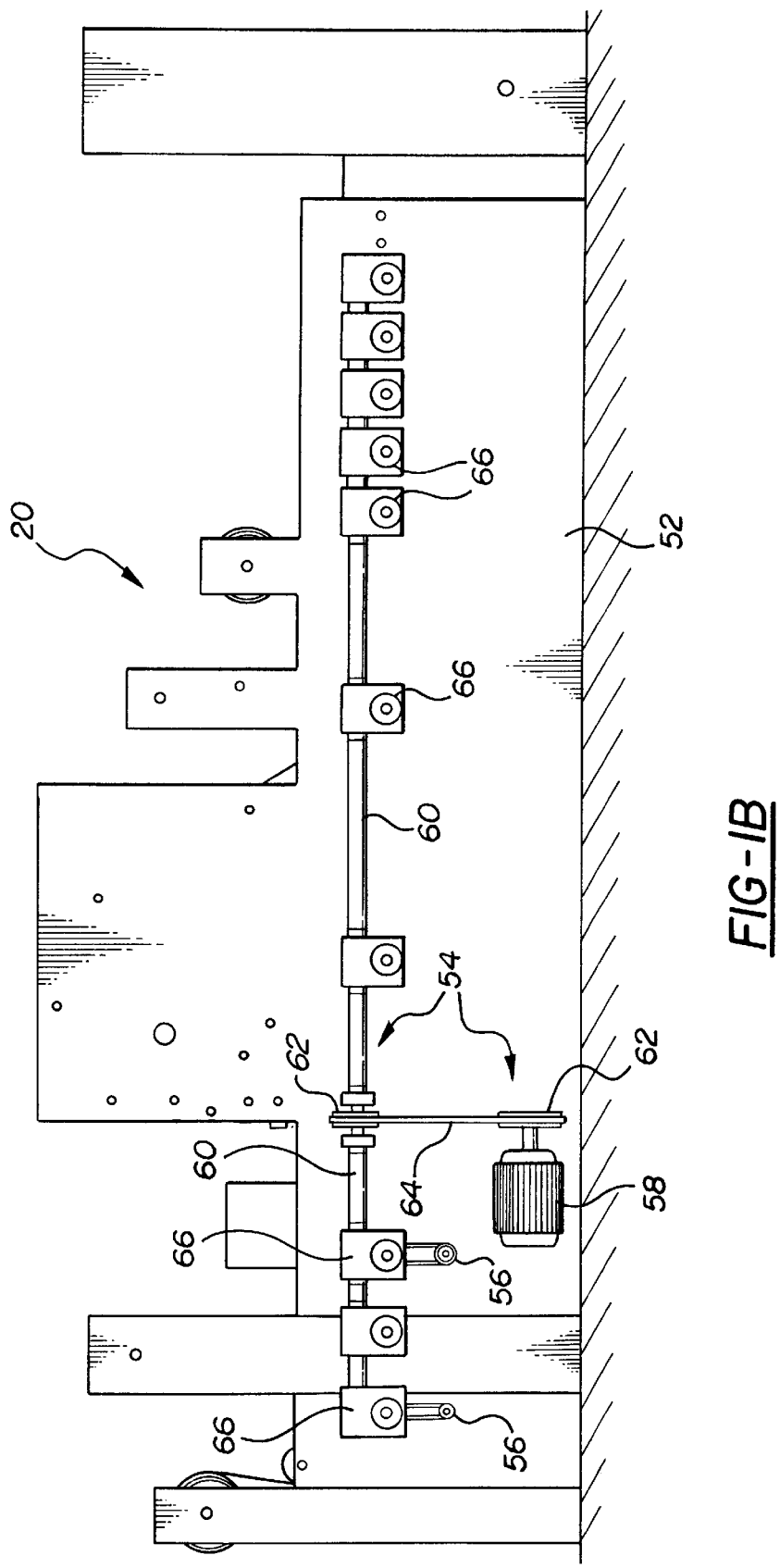
FIG. 1B is a rear schematic view of the card manufacturing machine.

Referring to the figures, wherein like numerals indicate like or corresponding parts throughout the several views, a card manufacturing machine assembly for producing an individual coupon card 22 is generally shown at 20 in FIGS. 1A and 1B. Specifically, FIG. 1A discloses a front view of the card manufacturing machine 20 and FIG. 1B discloses a rear view of the card manufacturing machine 20. The machine assembly 20 may be divided into four separate sections. Section A includes a printing station 24 and a laminating device 26, section B includes a cutting device 28, section C includes an inverting device 30 and a stripping device 32, and section D includes a pair of oppositely disposed coupling rollers 34 and a pair of oppositely disposed forming rollers 36.

A rolled continuous sheet of stock 38 is mounted to a rotating shaft 40 before the printing station 24 of section A. This continuous sheet of stock 38 is also known in the art as a web sheet or sheet of card stock.

The continuous sheet of stock 38 has a bottom surface 42 with an adhesive layer 44 and a release liner 46 adhered thereto. The sheet of stock 38 also has a top surface 48 which is covered by a clear laminate 50. The clear laminate 50 is discussed in greater detail hereinbelow. The sheet of stock 38, adhesive layer 44, and release liner 46 are shown in spaced apart relationship in FIG. 2. For illustrative purposes, the relative sizes of the adhesive layer 44 and release liner 46 are exaggerated. The release liner 46 also includes a silicone finish (not shown) disposed on at least one side which allows the release liner 46 to be removed from the adhesive layer 44 without removing the adhesive or damaging the sheet of stock 38.

A support frame 52 is provided for supporting the continuous sheet of stock 38 as the sheet of stock 38 moves through the machine assembly 20. The support frame 52 may be of any suitable size and shape as is known in the art. Referring to FIG. 113, a driving mechanism, generally shown at 54, is mounted to the support frame 52 and has a plurality of driving gears 56 for transferring the sheet of stock 38 through the machine assembly 20 at a predetermined speed. The driving gears 56 are illustrated best in FIGS. 1A, 4, 7, 8, 11 and 12 and are discussed in greater detail below. The driving mechanism 54 includes a single drive motor 58 interconnected to a common output drive shaft 60. The motor 58 is connected to the output drive shaft 60 by a pair of pulleys 62 and interconnecting belt 64. A plurality of gear boxes 66 are connected to the output drive shaft 60. The driving gears 56 extend from the gear boxes 66 wherein the gear boxes 66 interconnect the driving gears 56 to the output drive shaft 60. As appreciated, this interconnection may be accomplished by a number of cams, belts or any other suitable means as is known in the art. The rotation of the output drive shaft 60 is therefore transferred to the driving gears 56. As appreciated, each of the gear boxes 66 rotates at a relatively common speed which subsequently rotates each of the driving gears 56 at a relatively common speed. This common rotation transfers the sheet of stock 38 through the machine assembly 20 at the predetermined speed. This type of driving mechanism 54 for these types of manufacturing machines are known to those skilled in the art.

Figure 3:
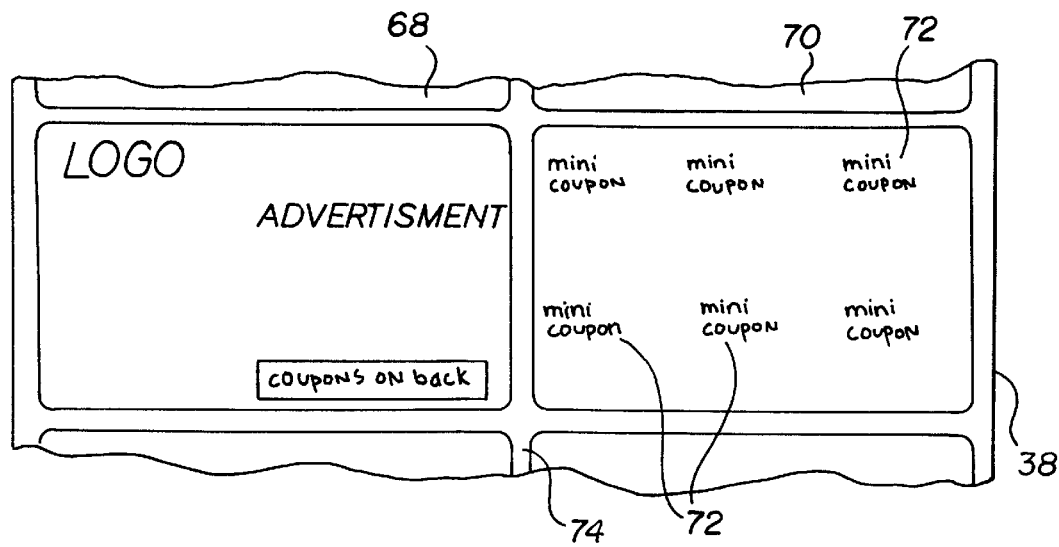
FIG. 3 is a fragmentary top view taken along line 3 of FIG. 1.

The forming of the coupon card 22 from the continuous sheet of stock 38 is now discussed in greater detail with reference to the remaining Figures. Referring to FIGS. 1A and 3, the continuous sheet of stock 38 is fed into the printing station 24 which prints indicia on the top surface 48 of the continuous sheet of stock 38 in two parallel rows at the same time which define a first strip 68 and a second strip 70 of the sheet of stock 38. Current printing stations may utilize a number of Cyrel printing plates (not shown) as known to those skilled in the art. Variable speed laser printers may also be used as printing stations without deviating from the scope of the subject invention. The length of the printing station 24 is depended upon the number of colors used which in turn determines the number of printing plates and/or laser printers used.

As best shown in FIG. 3, the parallel rows define the first strip 68 and the second strip 70 of the sheet of stock 38 wherein these strips 68, 70 are continuously moving along a path. More specifically, the path is a longitudinal path that generally runs the lengthwise dimension of the manufacturing machine assembly 20. As appreciated, the driving mechanism 54 moves the parallel rows of card stock 38 along the longitudinal path. Commonly printed indictum comprises appropriate logo(s) and/or word(s) which may include manufacturing, marketing, charity information, and the like. The preferred embodiment of the subject invention includes marketing information printed on the first strip 68 and a number of mini-coupons 72 and other related information printed on the second strip 70. An unprinted line 74 separates the parallel printed messages on the first 68 and second 70 strips as shown in FIG. 3. As one skilled in the art can appreciate, any type or design of indicia may be printed on either the first 68 or second 70 strips without deviating from the scope of the subject invention. Further, the strips 68, 70 may be of any width and may be of equal widths as in the preferred embodiment or of unequal widths.

After the printing is completed, the laminating device 26 applies the clear laminate 50 to the top surface 48 of the sheet of stock 38 for viewing the indicia. Specifically, the laminate 50 is a clear polyester laminate 50 that is rolled onto a shaft (not numbered) above the continuous sheet of stock 38. The laminate 50 protects the top surface 48 of the stock 38 and ensures that the indicia will not smear, rub off, or otherwise be damaged.

Figure 4:
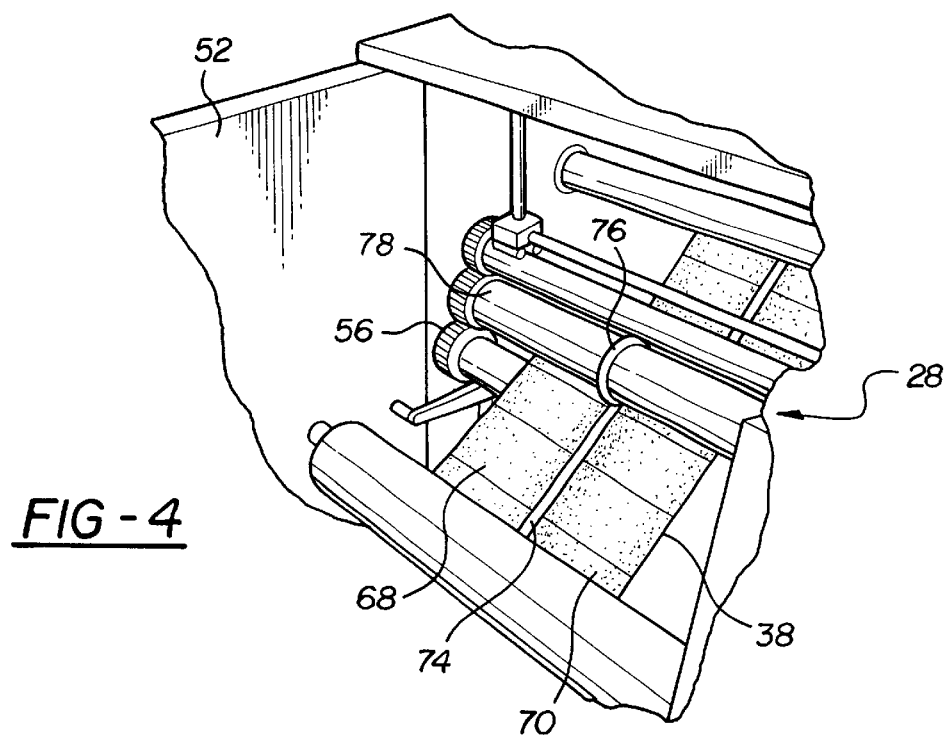
FIG. 4 is a fragmentary perspective view of a cutting wheel.
Figure 5:
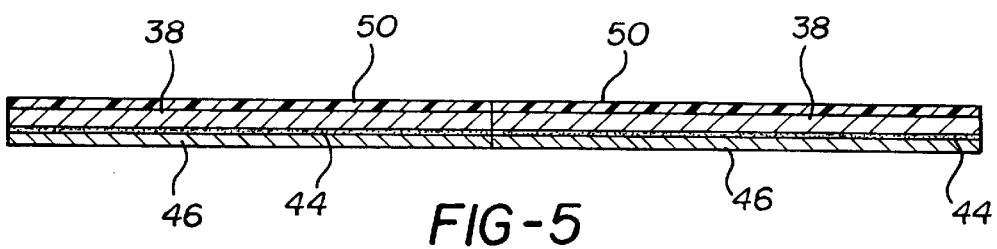
FIG. 5 is a cross-sectional view taken along line 5—5 of FIG. 1.

The continuous sheet of stock 38 then moves into section B where the cutting device 28 separates the continuous sheet of stock 38 into the first 68 and second 70 strips. As best shown in FIG. 4, the cutting device 28 comprises an annular blade 76 anchored to a cutting roller 78. The sheet of stock 38 passes underneath the annular blade 76 wherein the annular blade 76 cuts through the sheet of stock 38 along the unprinted line 74 between the first 68 and second 70 strips. Although the strips 68, 70 are separated they remain in close proximity to each other. As best shown in FIG. 5, the first 68 and second 70 strips comprise the sheet of stock 38 with the adhesive layer 44 and the release liner 46 applied to the bottom surface 42 and the laminate 50 applied to the top surface 48.

The continuous sheet of stock 38 then moves into section C where the first 68 and second 70 strips actually separate. The first strip 68 continues along the longitudinal path and passes over the second strip 70. In other words, the first strip 68 runs the lengthwise dimension of the manufacturing machine assembly 20. The second strip 70 separates from the first strip 68 and passes into the inverting device 30. The inverting device 30 is shown schematically in FIG. 1A and more specifically in FIG. 6. Generally, the inverting device 30 rotates one of the first 68 and second 70 strips 180° relative to the other first 68 and second 70 strip. As one skilled in the art can appreciate, either of the strips 68, 70 may be inverted without deviating from the scope of the subject invention.

The inverting device 30 includes a first turn bar 80 and a second turn bar 82 with a vertical axis 84 passing through an intersection of the first 80 and second 82 turn bars. Preferably, the first turn bar 80 is positioned at a 45° angle clockwise with respect to the vertical axis 84 and the second turn bar 82 is positioned at a 45° counter-clockwise with respect to the vertical axis 84. As discussed above, the second strip 70 preferably passes around the turn bars 80, 82 to be inverted 180°. The preferred embodiment of the turn bars 80, 82 creates the least amount of stresses on the sheet of stock 38 as the second strip 70 passes around the turn bars 80, 82. As known to those skilled in the art, the first turn bar 80 could be positioned at any acute angle with respect to the vertical axis 84 and the second turn bar 82 could be positioned at any acute angle with respect to the vertical axis 84 so long as the sum of the acute angles equals 90°. The inverting device 30 may also include a number of additional bars and/or rollers for moving the second strip 70 of card stock 38 through the inverting device 30. The inverting device 30 and its unique operation and related components form the claimed subject matter of U.S. Pat. No. 5,776,287 which is assigned to the assignee of the subject invention and is herein incorporated by reference.

Figure 6:
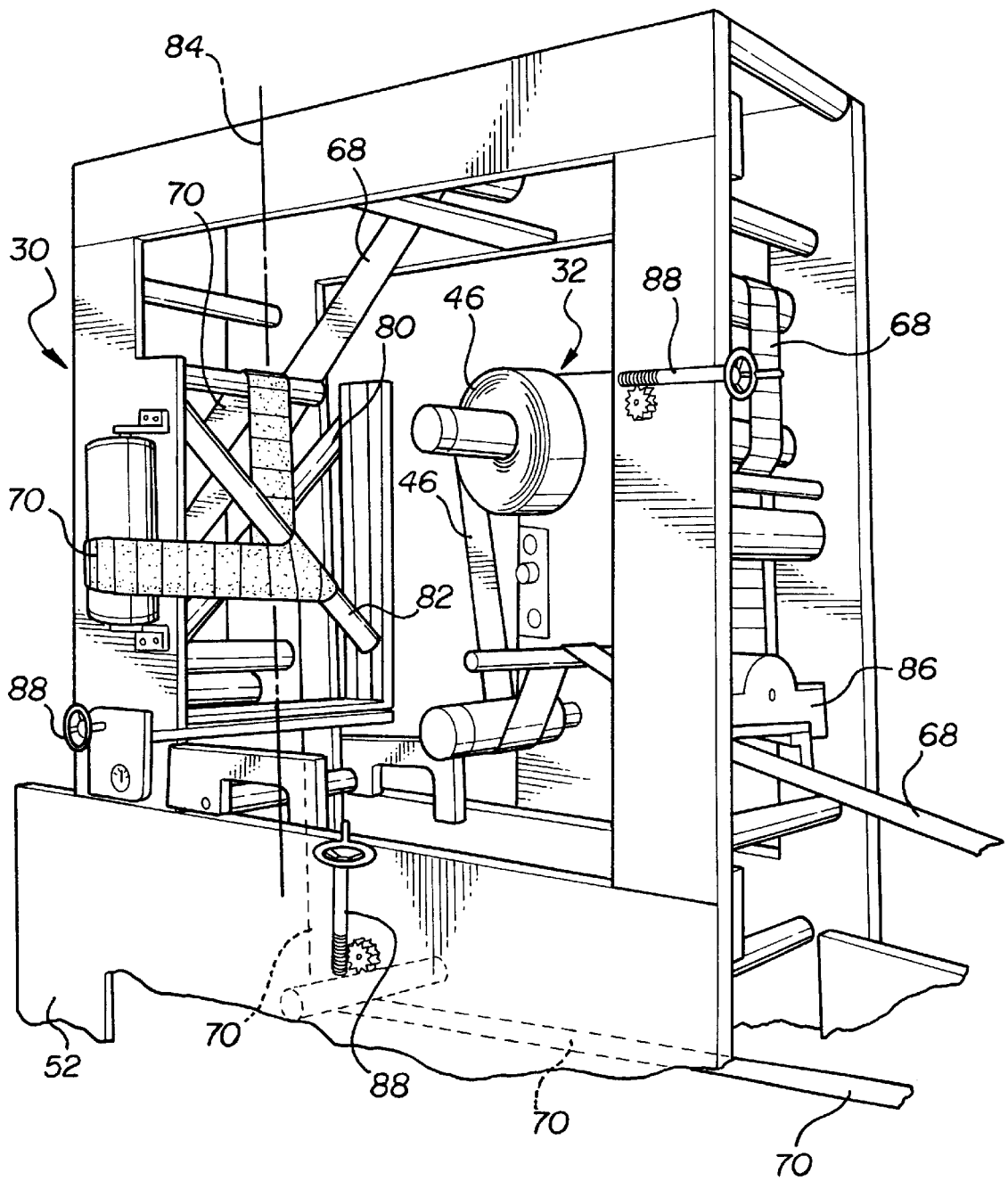
FIG. 6 is a fragmentary perspective view of an inverting device.

The stripping device 32 is also located within section C next to the inverting device 30. As best shown in FIG. 6, the stripping device 32 removes the release liner 46 from the first strip 68 to expose the adhesive layer 44. The release liner 46 is then rolled onto a shaft (not numbered). As one can appreciate, the release liner 46 may be removed from the second strip 70 without deviating from the scope of the subject invention. Immediately after the release liner 46 is removed, the first strip 68 passes through an electronic adjustment mechanism 86. Such electronic adjustment mechanisms electronically control the position of the corresponding strip 68, 70 as is known in the art.

At least one machine adjustment de is disposed on the support frame 52 for adjusting the first 68 and second 70 strips as the first 68 and second 70 strips move through the inverting device 30 and along the longitudinal path through the machine assembly 20. As shown in FIG. 6, there are a number of manually operated adjustment mechanisms 88. However, any type or number of automatic or manual adjustment mechanism(s) may be utilized without deviating from the scope of the subject invention.

Figure 7:
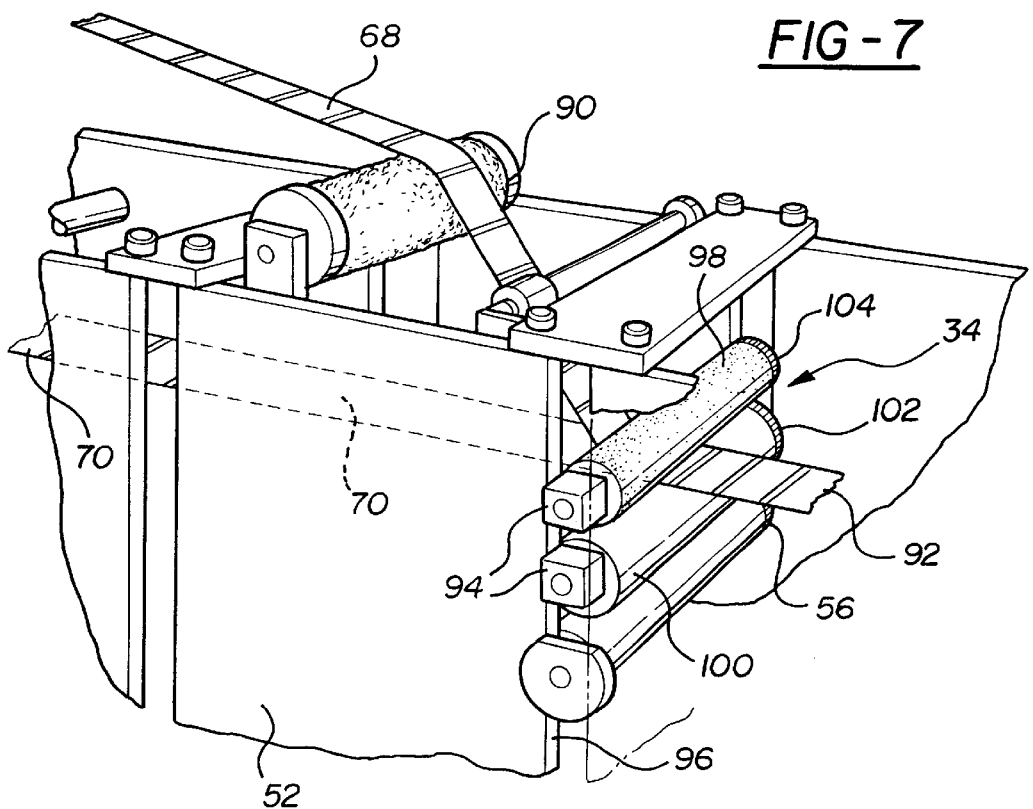
FIG. 7 is a fragmentary perspective view of a non-stick roller and a pair of coupling rollers.

The first 68 and second 70 strips then move into section D of the card manufacturing machine assembly 20. As shown in FIG. 7, the first strip 68, which has the adhesive layer 44 exposed, passes over a non-stick roller 90 having a plurality of looped fibers adhered thereto whereby the adhesive layer 44 of the first strip 68 does not adhere to the roller 90. After the first strip 68 passes over the non-stick roller 90, the first 68 and second 70 strips should be aligned both horizontally and longitudinally. In other words, the printed indicia of the first 68 strip should align with the printed indicia of the second strip 70. The coupling rollers 34 and forming rollers 36 of the subject invention are specifically designed to maintain the desired alignment of the first 68 and second 70 strips. By maintaining exact alignments, each individual two-sided coupon card 22 will be manufactured in accordance with desired specifications. In other words, the two-sided coupon cards 22 will have perfectly aligned indicia on both sides thereof.

Figure 9:
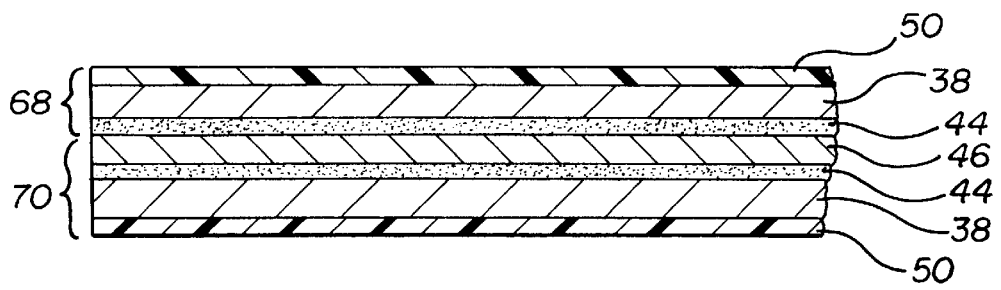
FIG. 9 is a fragmentary cross-sectional view taken along line 9—9 of FIG. 1.
Figure 11:
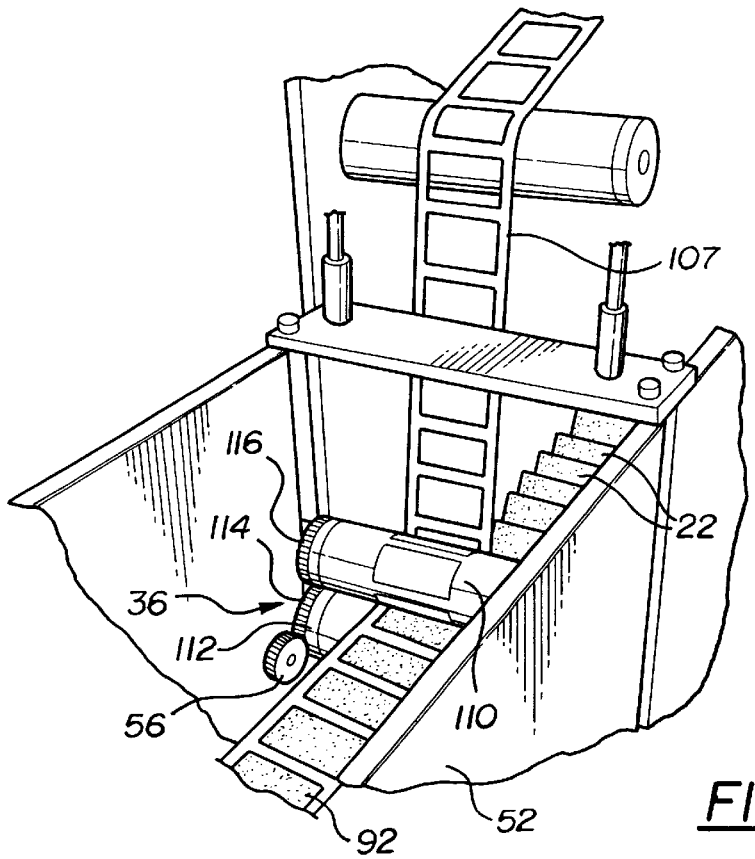
FIG. 11 is a fragmentary perspective view of a pair of forming rollers.

The first 68 and second 70 strips now move into engagement with the coupling rollers 34. Specifically, the coupling rollers 34 move the adhesive layer 44 of the first strip 68 into a bonded relationship with the release liner 46 of the second strip 70 to mate the first 68 and second 70 strips and form a continuous series of two-sided coupon cards 92 with the indicia printed on both sides thereof. Specifically, the continuous sheet of stock 38 having the two strips 68, 70 as shown in FIGS. 3, 4 and 5 is now converted to the continuous series of two-sided coupon cards 92 as shown in FIGS. 7, 9 and 11.

Figure 8:
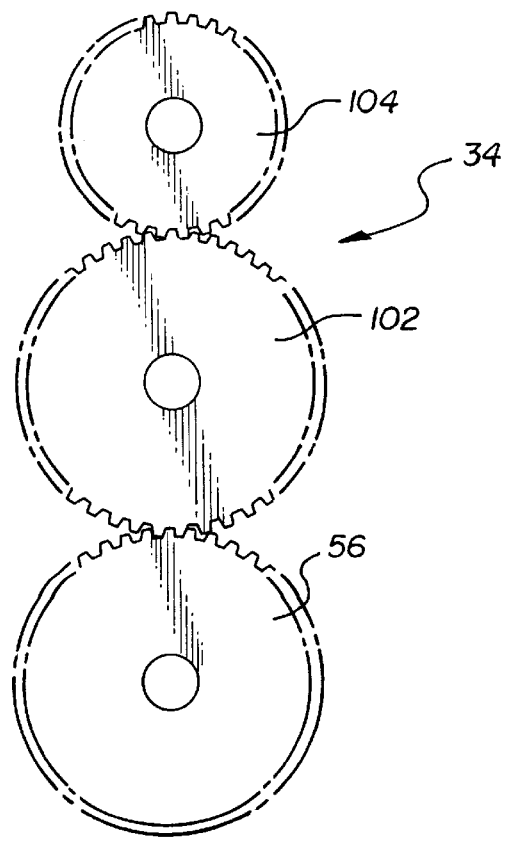
FIG. 8 is a detailed side view of the coupling rollers illustrating a gearing arrangement.

As illustrated best in FIGS. 7 and 8, the coupling rollers 34 are mounted to the support frame 52 and are in driving engagement with one of the driving gears 56 for defining a first ratio to rotate the coupling rollers 34 at a predetermined rotational speed. Specifically, each of the coupling rollers 34 have a mounting block 94 for mounting the coupling rollers 34 within a slot 96 formed within the support frame 52. Although not shown, an adjustment device engages the coupling rollers 34 to secure the rollers 34 to the support frame 52 and provide incremental adjustment This type of mounting and adjustment method is known to those skilled in the art.

The predetermined rotational speed of the coupling rollers 34 correlates to the predetermined speed of the continuous sheet of stock 38 as the sheet of stock 38 passes through the machine assembly 20. In other words, by virtue of gearing the coupling rollers 34 to the driving mechanism 54, the coupling rollers 34 help ensure the continuous movement of the sheet of stock 38, as well as the strips 68, 70, through the machine assembly 20.

Preferably, the coupling rollers 34 comprise a top roller 98 and a bottom roller 100. The top roller 98 has a resilient, substantially rubber-like exterior for gripping the first strip 68 and creating the continuous series of two-sided coupon cards 92. The bottom roller 100 is a metal cylinder having a smooth exterior surface. The first 68 and second 70 strips interface with the top 98 and bottom 100 rollers which mates and adheres the strips 68, 70 together. As discussed above, once the strips 68, 70 have passed through the coupling rollers 34, the continuous sheet of stock 38 is transformed into the continuous series of two-sided coupon cards 92. As best shown in FIG. 9, the laminate 50 of the first strip 68 is now a top surface of the coupon card 22, and the laminate 50 of the second strip 70 is now a bottom surface of the coupon card 22. In other words, the top surface, of the series of coupon cards 92, includes the first half having the marketing information printed thereon, and the bottom surface, of the series of coupon cards 92, includes the second half having the mini-coupons 72 and other related information printed thereon. This structure creates a two-sided coupon card 22 having two layers of card stock 38. One layer of card stock 38 may be removed with the mini-coupons 72 and the other layer of card stock 38 remains on the coupon card 22 to provide sufficient rigidity for the card 22.

The bottom roller 100 includes a first spur gear 102 having a first plurality of teeth engaging one of the driving gears 56 of the driving mechanism 54 for creating the first driving ratio and rotating the bottom roller 100 at the predetermined rotational speed. The top roller 98 includes a second spur gear 104 having a second plurality of teeth engaging the first spur gear 102 of the bottom roller 100 for rotating the top roller 98 at the predetermined rotational speed. Preferably, the first 102 and second 104 spur gears have substantially the same diameters as the bottom 100 and top 98 rollers. The top 98 and bottom 100 rollers now rotate at the predetermined rotational speed which moves the continuous sheet of stock 38 through the coupling rollers 34 at the predetermined speed. As appreciated, the top roller 98, having the rubber-like exterior, may be of a smaller diameter and rotate slightly faster than the predetermined speed such that the top roller 98 continuously grips and pulls on the first strip 68 to maintain a sufficient taughtness with the first strip 68.

Figure 10:
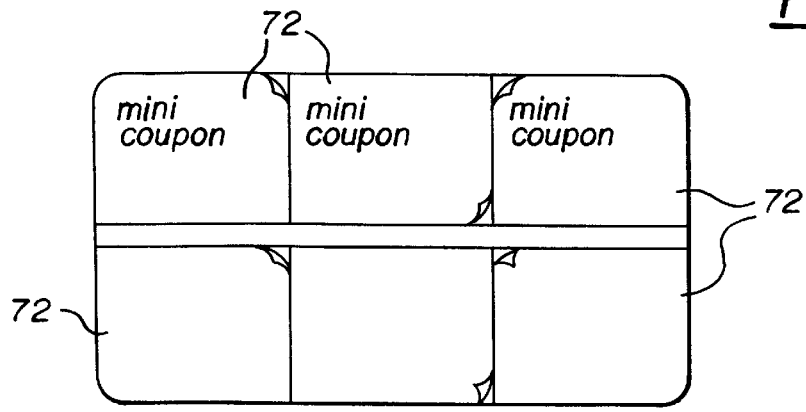
FIG. 10 is a bottom view taken along line 10 of FIG. 1.

The continuous series of two-sided coupon cards 92 then moves along the machine assembly 20 and the bottom surface or second strip 70 is scored by scoring wheel 106 (as shown in FIG. 1A) to form the perimeter of the mini-coupons 72. The scoring is substantial enough such that the mini-coupons 72 may be removed without affecting the adhesion of the remaining mini-coupons 72. The scoring does not, however, sever through both layers of the stock 38. As best shown in FIG. 10, the mini-coupons 72 may be individually peeled off and redeemed.

Figure 12:
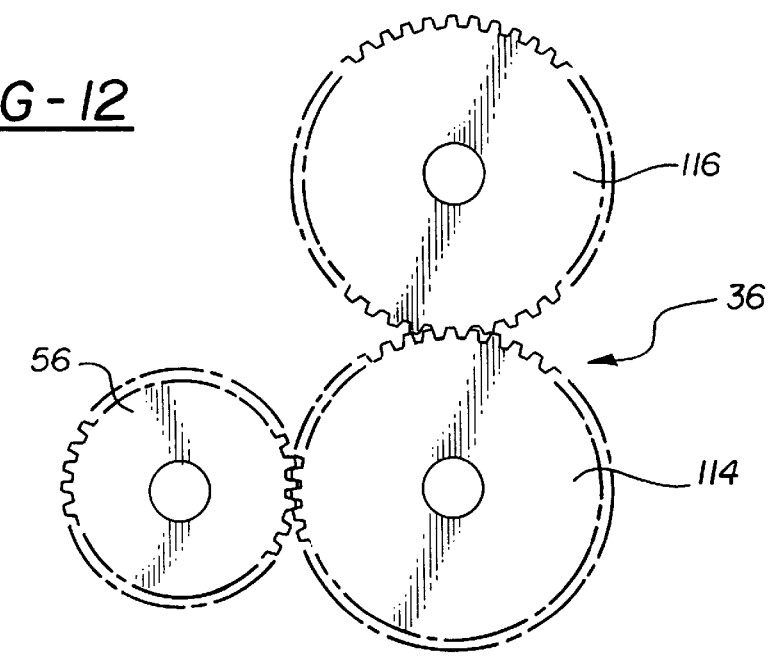
FIG. 12 is a detailed side view of the forming rollers illustrating a gearing arrangement.
Figure 13:
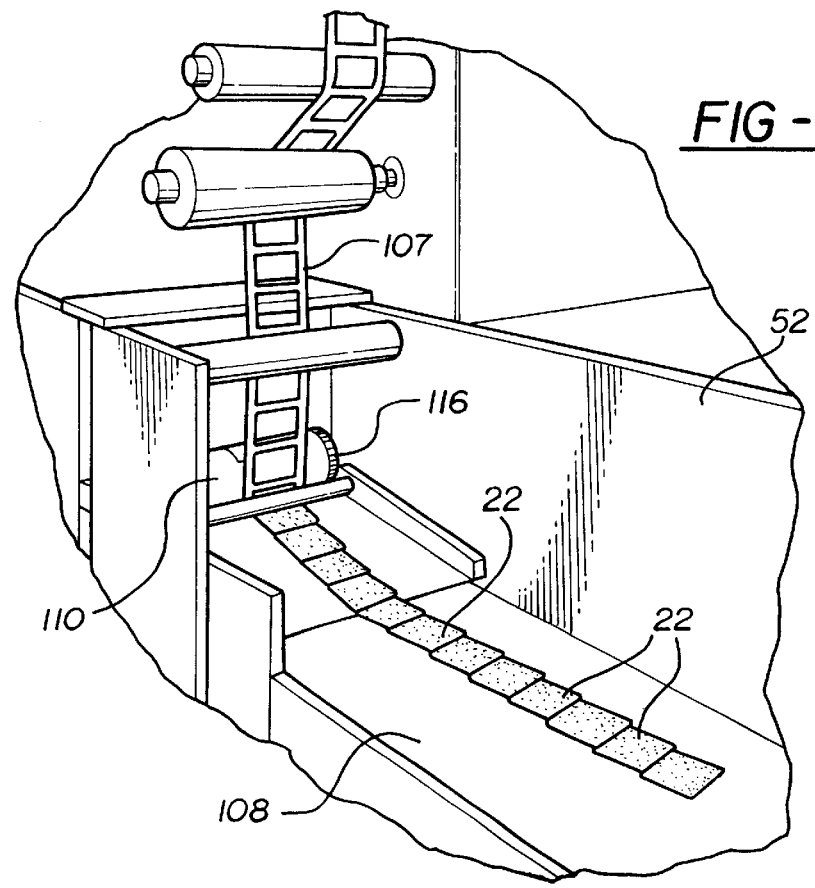
FIG. 13 is a fragmentary perspective view of an exit chute.

Referring to FIGS. 11 through 13, the continuous series of two-sided coupon cards 92 then moves through the forming rollers 36. The forming rollers 36 engage the continuous series of two-sided coupon cards 92 and remove any exterior material 107 from the first 68 and second 70 strips to form individual coupon cards 22. The separated individual two-sided coupon cards 22 subsequently accumulate along an exit chute 108.

The forming rollers 36 are mounted to the support frame 52 and are in driving engagement with one of the driving gears 56 for defining a second driving ratio to rotate the forming rollers 36 at a faster speed of rotation than the predetermined rotational speed. Although not specifically shown, the forming rollers 36 are mounted to the support frame 52 in a similar fashion as the coupling rollers 34. The faster speed of rotation for the forming rollers 36 is necessary to ensure that the continuous series of two-sided coupon cards 92 does not buckle or bend between the coupling rollers 34 and the forming rollers 36. The buckling or bending occurs due to the relative thickness of the continuous series of two-sided coupon cards 92 and the force imparted onto the series of coupon cards 92 by the forming rollers 36.

Specifically, the forming rollers 36 comprise a punch wheel roller 110 and an exit roller 112. The punch wheel roller 110 includes a scoring surface (not numbered) for cutting through the continuous series of two-sided coupon cards 92 to form the separated individual coupon cards 22. In other words, the punch wheel roller 110 punches out the coupon cards 22 from the continuous series of two-sided coupon cards 92. During normal operations, the punching force slightly slows the speed of the continuous series of coupon cards 92. Hence, the continuous series of coupon cards 92 my buckle. The subject invention rotates the forming rollers 36 at a slightly faster rate of rotation such that this buckling is eliminated.

As best illustrated in FIG. 12, the exit roller 112 includes a third spur gear 114 having a third plurality of teeth engaging one of the driving gears 56 of the driving mechanism 54 for creating the second driving ratio and rotating the exit roller 112 at the faster speed of rotation than the predetermined rotational speed. Accordingly, the second driving ratio is designed such that in comparison to the first driving ratio, the second driving ratio moves its corresponding rollers, the forming rollers 36, at a faster rate. This may be accomplished by having a fewer number of teeth, by changing the relative diameters of the rollers or by a combination of both.

The punch wheel roller 110 includes a fourth spur gear 116 having a fourth plurality of teeth engaging the third spur gear 114 of the exit roller 112 for rotating the punch wheel roller 110 at the faster speed of rotation than the predetermined rotational speed. Preferably, the third 114 and fourth 116 spur gears have substantially the same diameter as the exit 112 and punch wheel 110 rollers, respectfully. The exit roller 112 and punch wheel roller 110 both rotate at the faster speed of rotation than the predetermined rotational speed which moves the continuous series of two-sided coupon cards 92 through the forming rollers 36 at a faster rate than through the coupling rollers 34. As discussed above, this feature eliminates any potential buckling or bending of the continuous series of two-sided coupon cards 92 such that a high volume of well manufactured coupon cards 22 may be produced by the machine assembly 20 in a relatively short period of time.

The invention has been described in an illustrative manner, and it is to be understood that the terminology which has been used is intended to be in the nature of words of description rather than of limitation. Obviously, many modifications and variations of the present invention are possible in light of the above teachings. It is therefore to be understood that within the scope of the appending claims the invention may be practiced otherwise than as specifically described.

What is claimed is:

1. A card manufacturing machine assembly for producing a coupon card fabricated from a continuous sheet of stock having a top surface and a bottom surface having an adhesive layer and a release liner adhered thereto, said assembly comprising;

a support frame for supporting the continuous sheet of stock as the sheet of stock moves through said machine assembly;

a driving mechanism mounted to said support frame for transferring the sheet of stock through said machine assembly at a predetermined speed;

a printing station for printing indicia on the top surface of the continuous sheet of stock in two parallel rows that define a first strip and a second strip of the stock;

a cutting device for separating the continuous sheet of stock into the first and second strips;

an inverting device for rotating one of the first and second strips 180° relative to the other first and second strip;

a stripping device for removing the release liner from the first strip to expose the adhesive layer;

a pair of oppositely disposed coupling rollers mounted to said support frame and in driving engagement with said driving mechanism for defining a first driving ratio to rotate at least one of said coupling rollers at a predetermined rotational speed, said coupling rollers moving the adhesive layer of the first strip into a bonded relationship with the release liner of the second strip to mate the first and second strips and form a continuous series of two-sided coupon cards; and a pair of oppositely disposed second rollers mounted to said support frame and in driving engagement with said driving mechanism for defining a second driving ratio to rotate said second rollers at a faster speed of rotation than said predetermined rotational speed, each of said second rollers including an axis of rotation, said axes of said second rollers defining a vertical plane that is perpendicular to said continuous series of two-sided coupon cards such that said first and second strips are equally engaged by said second rollers at substantially the same time.

2. An assembly as set forth in claim 1 further including a laminating device for applying a clear laminate to the top surface of the stock for viewing the indicia.

3. An assembly as set forth in claim 1 wherein said inverting device further includes a first turn bar and a second turn bar with a vertical axis passing through an intersection of said first and second turn bars.

4. An assembly as set forth in claim 3 wherein said first turn bar is positioned at a 45° angle clockwise with respect to said vertical axis and said second turn bar is positioned at 45° angle counter-clockwise with respect to said vertical axis.

5. An assembly as set forth in claim 1 wherein said cutting device further includes an annular blade anchored to a cutting roller whereby the sheet of stock passes underneath said annular blade and cuts the sheet of stock between the first and second strips to separate the first and second strips.

6. An assembly as set forth in claim 1 further including at least one machine adjustment device disposed on said support frame for adjusting the first and second strips.

7. An assembly as set forth in claim 1 further including a non-stick roller having a plurality of looped fibers adhered thereto whereby the adhesive layer of the first strip passes over said non-stick roller before passing through said coupling rollers.

8. An assembly as set forth in claim 1 wherein said coupling rollers comprise a top roller and a bottom roller.

9. An assembly as set forth in claim 8 wherein said bottom roller includes a first spur gear having a first plurality of teeth engaging one of said driving gears of said driving mechanism for creating said first driving ratio and rotating said bottom roller at said predetermined rotational speed.

10. An assembly as set forth in claim 9 wherein said top roller includes a second spur gear having a second plurality of teeth engaging said first spur gear of said bottom roller for rotating said top roller at said predetermined rotational speed.

11. An assembly as set forth in claim 10 wherein said top roller has a resilient substantially rubber-like exterior for gripping said series of two-sided coupon cards.

12. An assembly as set forth in claim 10 wherein said forming rollers comprise a punch wheel roller and an exit roller.

13. An assembly as set forth in claim 12 wherein said exit roller includes a third spur gear having a third plurality of teeth engaging one of said driving gears of said driving mechanism for creating said second driving ratio and rotating said exit roller at said faster speed of rotation than said predetermined rotational speed.

14. An assembly as set forth in claim 13 wherein said punch wheel roller includes a fourth spur gear having a fourth plurality of teeth engaging said third spur gear of said exit roller for rotating said punch wheel roller at said faster speed of rotation than said predetermined rotational speed.

15. An assembly as set forth in claim 14 wherein said punch wheel roller includes a scoring surface for cutting through the series of two-sided coupon cards and forming the individual coupon cards.

16. An assembly as set forth in claim 8 wherein said driving mechanism includes a plurality of driving gears.

17. An assembly as set forth in claim 10 wherein said second rollers are further defined as forming rollers in driving engagement with one of said driving gears, said forming rollers engaging said series of two-sided coupon cards and removing any exterior material from the first and second strips to form individual coupon cards.

* * * * *